(12) United States Patent
Abari et al.

(10) Patent No.: US 10,803,743 B2
(45) Date of Patent: Oct. 13, 2020

(54) MONITORING AMBIENT LIGHT FOR OBJECT DETECTION

(71) Applicant: Lyft, Inc., San Francisco, CA (US)

(72) Inventors: Farzad Cyrus Foroughi Abari, San Bruno, CA (US); Corey Frederick Bangs, Cupertino, CA (US)

(73) Assignee: Lyft, Inc., San Francisco, CA (US)

( * ) Notice: Subject to any disclaimer, the term of this patent is extended or adjusted under 35 U.S.C. 154(b) by 135 days.

(21) Appl. No.: 15/969,693

(22) Filed: May 2, 2018

(65) Prior Publication Data

US 2019/0340924 A1 Nov. 7, 2019

(51) Int. Cl.
*G06K 9/00* (2006.01)
*G08G 1/0962* (2006.01)
*G06K 9/62* (2006.01)
*G06N 20/00* (2019.01)

(52) U.S. Cl.
CPC ..... *G08G 1/09623* (2013.01); *G06K 9/00805* (2013.01); *G06K 9/00818* (2013.01); *G06K 9/6256* (2013.01); *G06K 9/6268* (2013.01); *G06N 20/00* (2019.01); *G06K 2209/21* (2013.01)

(58) Field of Classification Search
CPC .................................................. G06K 9/6256
See application file for complete search history.

(56) References Cited

U.S. PATENT DOCUMENTS

| 6,628,829 B1* | 9/2003 | Chasen ..................... G01J 3/46 382/165 |
| 2005/0232469 A1* | 10/2005 | Schofield ........... G06K 9/00818 382/104 |
| 2006/0171704 A1* | 8/2006 | Bingle ................... H04N 7/183 396/419 |
| 2012/0162427 A1* | 6/2012 | Lynam ..................... B60R 1/00 348/148 |
| 2019/0250630 A1* | 8/2019 | Zhao ......................... G06T 7/62 |
| 2019/0303725 A1* | 10/2019 | Gurvich ............... G06K 9/6256 |
| 2019/0313073 A1* | 10/2019 | Patel ....................... H04N 9/78 |

* cited by examiner

*Primary Examiner* — Oneal R Mistry
(74) *Attorney, Agent, or Firm* — Baker Botts L.L.P.

(57) ABSTRACT

In particular embodiments, a computing system may receive ambient light measurements of a scene. The ambient light measurements may be generated by one or more light sensors of a vehicle. The system may receive an image captured by an optical sensor of the vehicle. The image may include color information associated with an object in a scene. The system may process the image to estimate a color associated with the object based on the ambient light measurements and the color information in the image. The system may determine the object based on the estimated color and may provide instructions to activate a safety feature in response to the determined object.

20 Claims, 9 Drawing Sheets

MONITORING AMBIENT LIGHT FOR OBJECT DETECTION

BACKGROUND

Vehicles are increasingly being equipped with intelligent features that allow them to monitor their surroundings and make informed decisions on how to react. Such vehicles, whether autonomously or manually driven, may be capable of sensing its environment and navigating with little or no human input. The vehicle may include a system having a variety of modules or sub-systems for enabling the vehicle to determine its surroundings so that it may safely navigate to target destinations or assist the human driver (if one is present) with doing the same. The vehicle may have a computer (e.g., one or more central processing units, graphical processing units, memory, and storage) for controlling various operations of the vehicle, such as driving and navigating. To that end, the computer may process data from one or more sensor arrays. For example, an autonomous vehicle may have optical cameras for, e.g., recognizing hazards, roads and lane markings. Data from these systems and modules may be used to safely drive the vehicle, activate certain safety features (e.g., automatic braking), or alert a human driver of potential dangers.

A vehicle's reaction to its environment largely depends on how accurately it can detect objects in the environment (e.g., road signs, people, trees, road crossings, rocks, etc.). For example, if the vehicle is going forward and there is a stop sign ahead, then the vehicle would need to detect the stop sign so that it can come to a complete stop or alert a human driver of the upcoming stop sign.

For image-based object detection, an object's color may be a feature that can help with correct object identification (e.g., stop signs are known to be red). However, the perceived color of an object, as detected by an optical sensor, may be different from the object's true color, which is defined by the object's spectral reflectance properties independent of illumination. This is because the reflected light detected by the sensor depends not only on the intrinsic reflectance properties of the object but also the spectral properties of the ambient light that reflects off the object, the object's shape, the relative positions of the object and sensor, among other factors. For example, the color of a road sign may appear to look a bit different at noon than in the morning or evening due to differences in sun light. If the perceived color of an object changes or is different from its true color (e.g., due to the object's variable reflectivity as a function of ambient light), then the object may not be accurately detected, which in turn may influence the vehicle's response.

DESCRIPTION OF EXAMPLE EMBODIMENTS

Figure 1A:
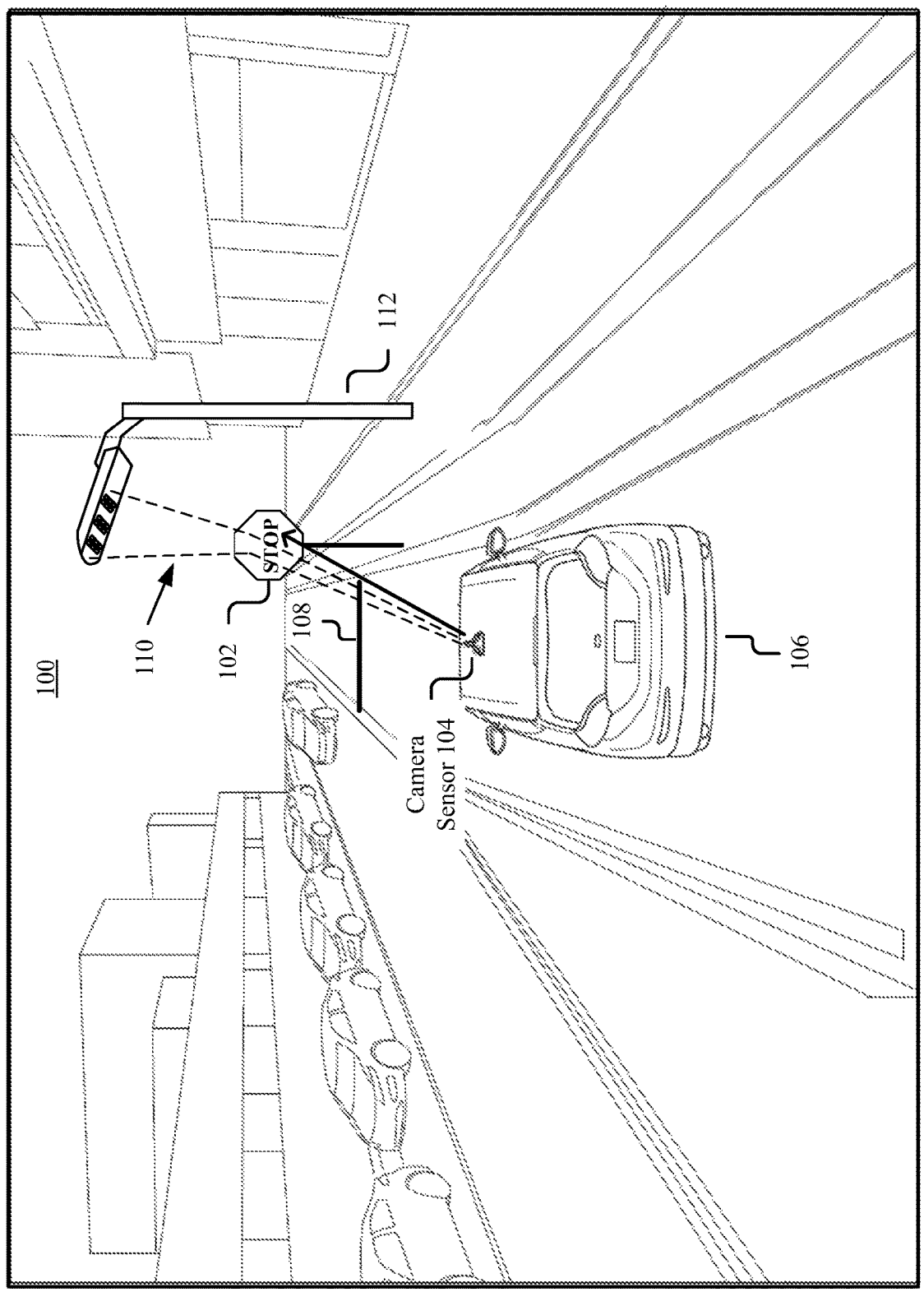
FIG. 1A illustrates the problem of a vehicle's sensor capturing ambient light bouncing/reflecting off an object. The ambient light consequently influences the perceived color of the object due to the object's reflectivity being a function of the ambient light that is interacting with the object.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

An optical or camera sensor of an autonomous vehicle may capture an image of an object by detecting and processing light that bounces off the object. The color detected may be based on a measurement of the intensity of particular wavelengths or color spectrums present in the received light (e.g., the amount of light in the red, green, and blue spectrums). The recorded values by the camera, among other things, depend on the ambient light spectra and the object reflectivity as a function of wavelength. As a result, depending on the type of light source present in the scene (e.g., sun light, halogen light, florescent light, etc.), the color of the object as captured by the camera sensor may appear different. Thus, the color detected by the camera sensor may be a function of at least the object's color and the ambient light and is not a pure measure of the object's reflectivity, which is perceived as color.

Particular embodiments described herein relates to systems, apparatuses, and methods for improving color estimations of objects as captured by camera sensor(s) of an autonomous vehicle and accurately detecting the objects using dedicated ambient light sensor(s) on the vehicle. Since color detected by a camera sensor is a function of the object's true reflectivity and ambient light, having one or more ambient light sensors measuring the ambient light characteristics present in a scene allows the system to better estimate the object's color. This information in turn may be used by a machine-learning model to detect various objects around the vehicle.

Figure 9:
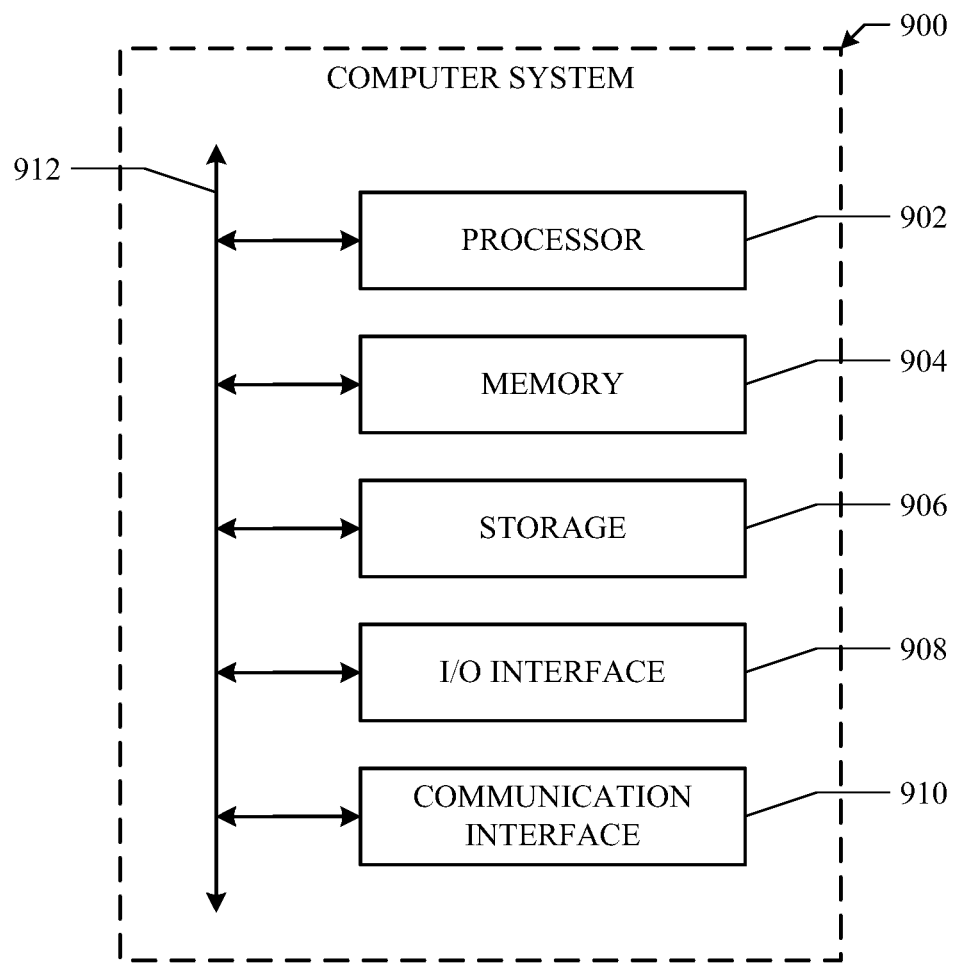
FIG. 9 illustrates an example of a computing system.

FIG. 1A illustrates the problem of light bouncing/reflecting off an object 102 and being captured by a camera sensor 104 of a vehicle 106, resulting in the perceived reflectivity (represented as color) of the object 102 being a function of ambient light in the environment. As depicted, FIG. 1A shows an example vehicle (e.g., an autonomous vehicle or human-driven vehicle) 106 going forward and equipped with the camera sensor 104 that may be configured to capture images of an environment/scene 100 surrounding the vehicle 106. Captured images may help in detecting one or more objects present in the environment so that the vehicle may act accordingly. For example, as shown in FIG. 1A, the camera sensor 104 may capture an image covering a 120° field of view of the scene in front of the vehicle. A computing system (e.g., computer system 900 as shown in FIG. 9) of the vehicle, upon processing the captured image, may detect a stop sign 102 and may, in response, instruct the vehicle to come to a complete stop at a marked limit line 108. In some embodiments, the computing system of the vehicle 106 may perform this object detection based on color properties associated with objects. For example, the computing system of vehicle may detect a stop sign based on a particular type of redness associated with the sign. As another example, the computing system of vehicle may detect trees based on a certain degree of green color associated with the trees. If the perceived color of an object (especially known objects by the vehicle) deviates from its true color, then accurate detection of these objects may be suboptimal, resulting in vehicle potentially taking no actions in response to upcoming objects or taking an inappropriate action. For example, as shown in FIG. 1A, light 110 from a street lamp 112 (e.g., a yellow light) reflects off of the stop sign 102 and is captured by the camera sensor 104. Therefore, the color information captured by the camera sensor 104 is a function of the true color/reflectivity associated with the object 102 (i.e., the stop sign) and the ambient light 110 that is reflected off the object 102. In the example illustrated in FIG. 1A, the red color of the stop sign 102 is mixed with the yellow light 110 from the street lamp 112, which may result in the camera sensor 102 detecting orange color. This mixing of colors may further result in the vehicle 106 not being able to detect the stop sign 102 (since its true color has been modified) and consequently crossing the marked limit line 108.

Figure 1B:
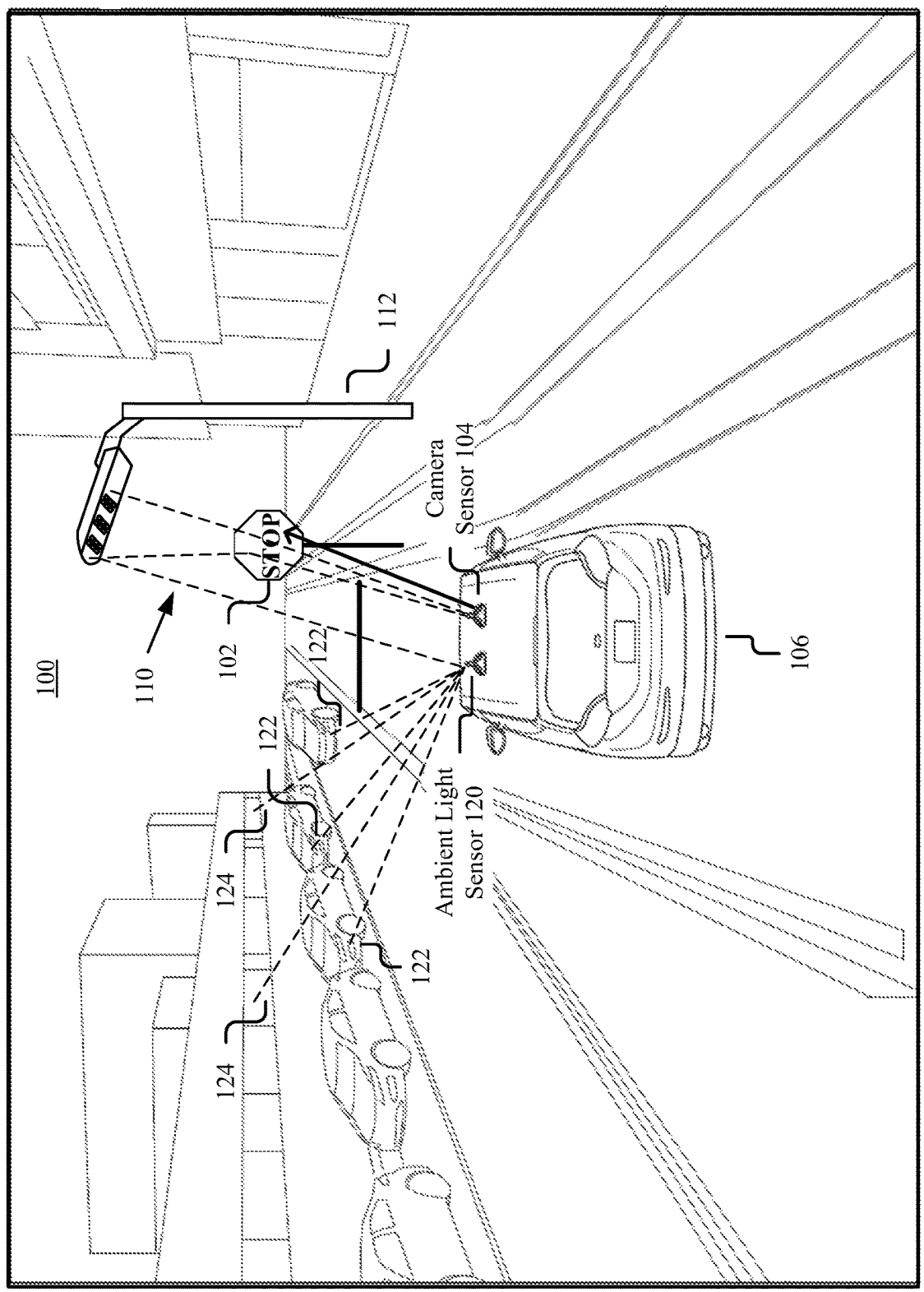
FIG. 1B illustrates an example solution to the problem illustrated in FIG. 1A.

FIG. 1B illustrates an example solution to the problem illustrated in FIG. 1A. In particular embodiments, the problem of object detection attributable to inaccurate color perception due to ambient light may be resolved by having one or more dedicated ambient light sensors 120 (e.g., a spectrometer) on the vehicle 106. For instance, as shown in FIG. 1B, the vehicle 106 may be equipped with the camera sensor 104 for measuring color information of particular objects in the scene and an ambient light sensor 120 for measuring the amount of ambient light in the scene. It should be understood that the present disclosure is by no means limited to a single ambient light sensor, as shown in FIG. 1B, and that any number of ambient light sensors may be included as needed. For example, the vehicle 106 may be equipped with four ambient light sensors located at the four corners or sides of the vehicle. The ambient light sensor 120 may be configured to detect different light sources or light present in the scene 100 (e.g., the sensor 120 may be pointed upwards to detect ambient light coming from above, such as street lamps and the sun) and generate measurements in cooperation with the computing system of the vehicle. For example, the ambient light sensor 120 may be configured to detect light 110 coming from the sun/moon, street lamp 112, light 122 coming from nearby vehicles, light 124 from nearby buildings, etc. The ambient light sensor 120 may generate measurements indicating the amount or intensity of ambient light in a certain spectrum, as shown and discussed further below in reference to FIG. 3. In particular embodiments, measurements regarding the ambient light affecting the detection of the object 102 may be used to estimate or approximate the true color of the object 102, which in turn may be used to improve the accuracy of object detection. As discussed above, the quantized color information captured by the camera sensor 104 for the object 102 may be a convolution of the ambient light 110 and the reflectance properties of the object 102. Using the measurements generated by the ambient light sensor 120, the computing system of the vehicle 106 may be able to carry out a more accurate estimation of the object's true color, as discussed in further detail below.

Figures 2, 3:
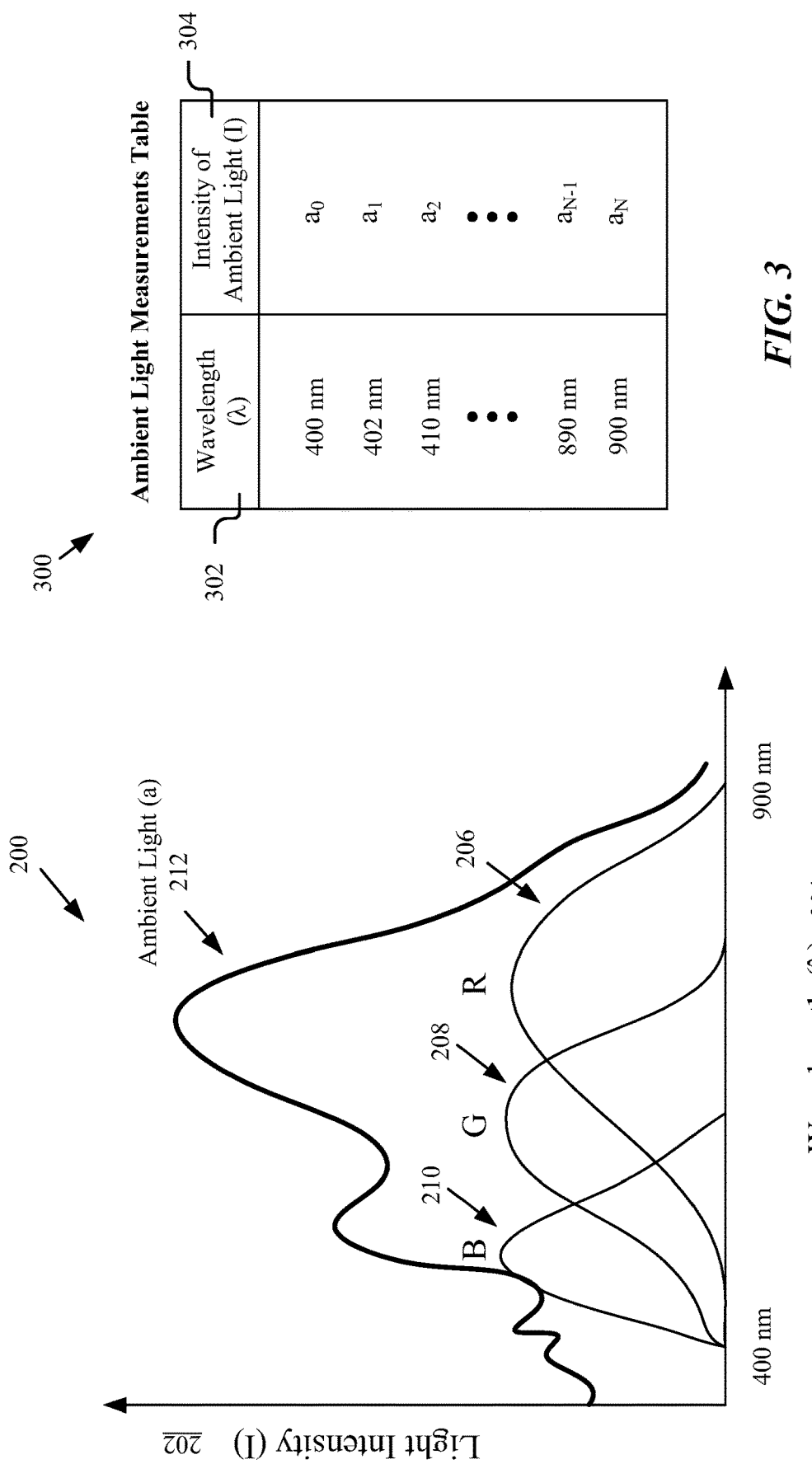
FIG. 2 illustrates an example light intensity vs. wavelength graph.
FIG. 3 illustrates an example table of ambient light measurements.

FIG. 2 illustrates an example light intensity vs. wavelength graph 200. In some embodiments, the graph 200 may also be called as an irradiance graph or curve. The graph 200 may represent the measured light intensity 202 of each of red 206, green 208, and blue 206 channels over a particular wavelength range 204, such as between 400-900 nanometers (nm) as shown in FIG. 2. For example, the graph 200 may indicate an intensity of red or amount of red color 206 present in the wavelength range of 400-900 nm. Similarly, the graph 200 may indicate the intensities or amount of green 208 and blue 210 colors in the wavelength range 400-900 nm. Along with the measured color intensities of RGB channels, the graph 200 also instance the measured intensity of ambient light 212 present in the particular wavelength range 204. In particular embodiments, the red measurement 206, green measurement 208, and blue measurement 210 may be generated based on color information captured by the camera sensor 104, and the ambient light 212 measurement may be generated by an ambient light sensor. To estimate the true color of an object, particular embodiments may deconvolve the ambient light measurement 212 from the RGB measurements 206, 208, 210, described in more detail below.

As described above, perceived color information may be a function of ambient light and the intrinsic reflectance properties of an object (which corresponds to the true color of the object). In some embodiments, the color information captured by the camera sensor 104 for each of the RGB components may be represented by following equations:

$$r = \int I(\lambda) R(\lambda) d(\lambda), \quad (1)$$

$$g = \int I(\lambda) G(\lambda) d(\lambda), \quad (2)$$

$$b = \int I(\lambda) B(\lambda) d(\lambda), \quad (3)$$

where $I(\lambda)$ represents the intensity of ambient light at a certain wavelength; $R(\lambda)$, $G(\lambda)$, and $B(\lambda)$ are the recorded values representing the area under the respective red, green, and blue color channels; and r, g, and b represent the observed or modified red, green, and blue components, respectively, at the certain wavelength.

In particular embodiments, measurements of ambient light may be represented by light-intensity measurements at different wavelength ranges, such as subranges within the wavelength range of 400-900 nm. FIG. 3 illustrates an example table 300 of ambient light measurements. The table 300 may include a first column 302 comprising a set of wavelength values (each value may, in particular embodiments, represent a wavelength subrange centered at the wavelength value) within a particular wavelength range (e.g., values between wavelength range 400-900 nm) and a second column 304 comprising intensity of ambient light corresponding to each of the wavelength values in the first column 302. In particular embodiments, an ambient light measurements table may be generated based on measurements by an ambient light sensor, such as the ambient light sensor 120. For instance, the ambient light sensor 120 may determine, for a particular wavelength, how much ambient light is present or what is the intensity of the ambient light at that wavelength in the detection field of the sensor 120. By way of an example, the ambient light sensor 120 may determine, within its field of detection, intensities of ambient light 110 coming from the lamp 112 and/or reflected from other objects (e.g., building 124) at different wavelength values. Accordingly, a table of ambient light measurements may be generated. While this example shows the spectral measurement of ambient light 110 being represented as a table, the measurement data may be represented or stored in any other suitable form, such as a graph or any suitable data structure.

In particular embodiments, the light intensity vs. wavelength graph 200 and the ambient light measurements (represented by a table 300 or any other suitable form of data representation) may be used by a computing system of the vehicle for object detection or white balancing. For instance, the computing system may receive color information from the camera sensor 104 of the vehicle and ambient light measurements from the ambient light sensor 120 of the vehicle to detect one or more objects around the vehicle. As an example, in reference to FIG. 1B, the computing system of the vehicle may obtain rgb values (as used herein, the lower-case "rgb" refers to the perceived color components, as represented by equations (1), (2), and (3) above) for the stop sign 102 as captured by the camera sensor 104, as well as ambient light measurements of the region as captured by the ambient light sensor 120. The computing system may correlate or compare the rgb components at different wavelengths with the ambient light present at those corresponding wavelengths to estimate or approximate the true RGB components. For instance, the computing system may estimate the true RGB components by deconvolving or subtracting the measured ambient light intensity present at a certain wavelength (e.g., as indicated by the ambient light measurements table) from each of the perceived rgb values determined for the corresponding wavelength. As an example, if the intensity of ambient light present at wavelength 400 nm is $a_0$, then the computing system may estimate the true RGB components for the wavelength 400 nm by deconvolving $a_0$ from observed rgb components determined for the wavelength 400 nm (based on the equations (1), (2), and (3) above). The computing system may estimate the true RGB components for the rest of the spectrum or wavelength values in the 400-900 nm range in a similar manner. Considering the above example in context of FIG. 1B, the computing system may estimate the color of the stop sign 102 (e.g., red color of the stop sign) by deconvolving the ambient light 110 (e.g., yellow light) captured by the ambient light sensor 120 from the perceived color information (e.g., orange light) captured by the camera sensor 104. In particular embodiments, the computing system may detect an object based on its estimation of the color of the object. For example, the computing system may detect that the object 102 is a stop sign based on its estimation of red color as being associated with the object 102. In particular embodiments, the computing system may use a machine-learning model that is trained to estimate or correct measured color and detect objects based on estimated/corrected colors, as discussed in further detail below in reference to FIGS. 4-6.

The determination or identification of an object may trigger a variety of responses from the vehicle 106 (e.g., an autonomous vehicle or conventional human-driven vehicle). In particular embodiments, the computing system of the vehicle 106 may activate a safety feature in response to determining that a detected object may affect the safety of the vehicle 106. For example, the object may be a known type of traffic sign (e.g., stop sign, stop light, speed limit sign, etc.), a pedestrian or other physical object (e.g., debris, pothole, animal, etc.) in or near the vehicle's path, another moving that may collide with the vehicle 106 based on its trajectory and/or speed, or any other object that the vehicle 106 may collide with. In response, the computing system of the vehicle 106 may activate a safety feature that is configured to send one or more driving instructions to the vehicle's actuators to actuate the appropriate driving maneuver. For instance, in response to a stop sign, the driving instruction may be to slow down and stop completely before the stop sign; in response to a yellow traffic light, the driving instruction may be to accelerate to pass the intersection before the traffic light turns red; in response to a yield sign, the driving instruction may be to slow down and emphasize object detection in particular directions in order to detect approaching vehicles; in response to a wrong-way sign, the driving instruction may be to back out of the street or not enter the street; and in response to a construction-zone sign or speed limit sign, the driving instruction may be to decelerate or accelerate to maintain the appropriate speed based on the sign. For embodiments where a driver is present (whether for a conventional human-driven vehicle or a safety driver for an autonomous vehicle), an activated safety feature may be configured to generate an alert associated with the determined object. For example, the alert may be a visual display of the detected object in a 3D model of the vehicle's surrounding, an audible (e.g., a beeping sound or computer-generated speech) or tactile (e.g., vibrating steering wheel or seat) alert that warns the driver of the detected object and the potential danger. As yet another example of a safety feature, the computing system of the vehicle 106 may determine that a detected object is a hazard for other vehicles (e.g., it may be debris, a stalled vehicle, etc.) and share information associated with the detected object, such as its location (e.g., based on GPS data) and the time of detection, with a central system or other vehicles within the region, so that the autonomous computing system or drivers of those vehicles may be aware of the potential hazard.

The vehicle 106 may also use object detection to support other types of features that are not directly related to safety. For example, a navigation feature that is helping a passenger find a particular destination (e.g., a store, a building, a parking garage, etc.) may use object detection to identify the destination of interest (e.g., based on appearance characteristics, including color, of logos, signs, building structures, etc.) and notify the passenger when the destination is nearby. As another example, an informational or touring feature may present a 3D model of the vehicle's surrounding with labels for detected objects. For instance, as the vehicle 106 drives by a building, landmark, or historic site, the computing system of the vehicle 106 may identify the site and surface a label or other information related to the identified site (e.g., trivia, history, name, year built, etc.).

Figure 4:
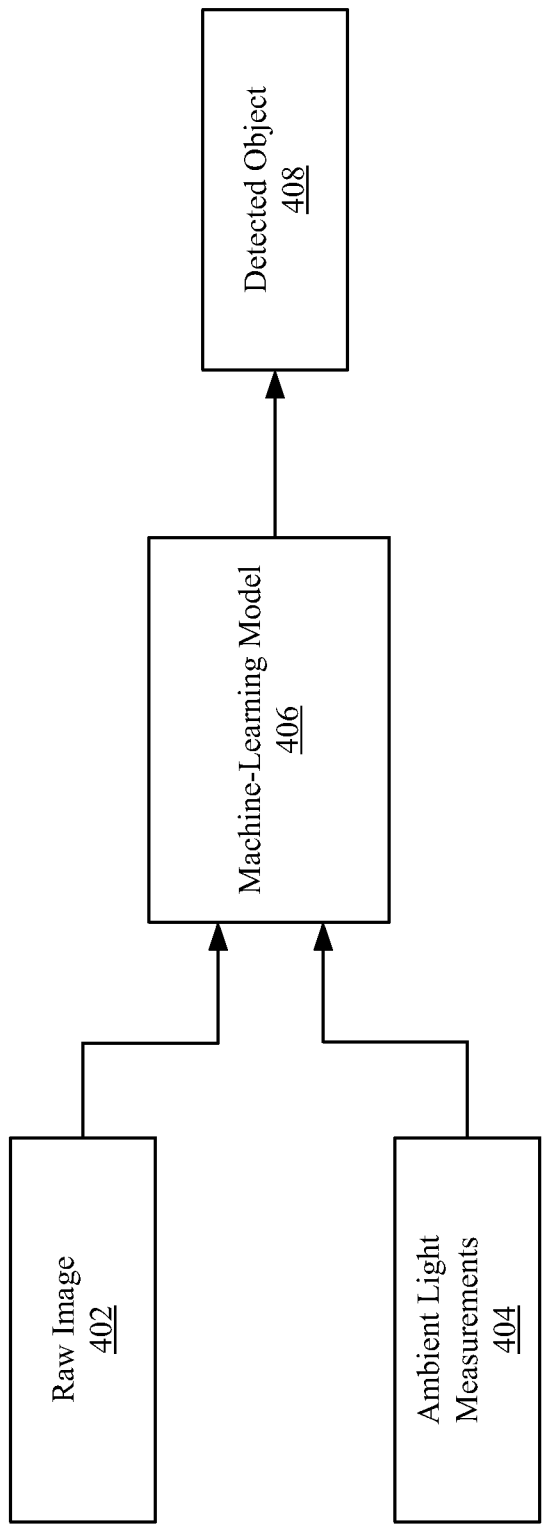
FIG. 4 illustrates an example machine-learning embodiment where a machine-learning model takes as input an image and ambient light information, and outputs object detection predictions.

FIG. 4 illustrates an example machine-learning embodiment where a machine-learning model 406 takes as input an image 402 and ambient light information 404, and outputs object detection predictions 408. In particular, the machine-learning model 406 may take as input a raw image 402 (or a compressed form of the raw image) of a visual scene as captured by a camera sensor (e.g., camera sensor 104) of a vehicle and ambient light measurements 404 as captured by an ambient light sensor (e.g., ambient light sensor 120) of the vehicle. The raw image 402 may include color information associated with an object in the scene. For example, as discussed above in reference to FIGS. 1A-1B, the image captured by the camera sensor 104 may include color information associated with the stop sign 102. Also, as discussed elsewhere herein, the color information captured by the camera sensor 104 for an object may be a function of the ambient light present in the scene. In particular embodiments, the ambient light measurements 404 may be generated by one or more ambient light sensors of the vehicle. For example, the ambient light measurements may be an average of measurements provided by four ambient light sensors located at four sides (e.g., front, back, left, right) of the vehicle. In some embodiments, the machine-learning model 406 may receive ambient light measurements 404 in the form of a table, as shown and discussed in reference to FIG. 3 above. Given a raw image including an object and ambient light measurements of the scene containing the object, the machine-learning model 406 may be trained to detect the object or output detected object 408. The additional ambient light information made available to the machine-learning model 406 can be used by the model to improve object-detection accuracy.

In some embodiments, object detection may be based on a two-step process. In the first step, the raw image may be processed to generate a corrected image, which may represent an approximate true color of objects in the scene. The color in the raw image may be corrected by deconvolving or subtracting ambient light present in the scene using the ambient light measurements. In the second step of the object detection process, the machine-learning model may predict an object based on corrected image or color estimated in the first step. The set of training samples for the second step may include a set of corrected images whose color information has been corrected based on detected ambient light. The ground truth or training target of each training sample may be one or more identifications of one or more objects depicted in the corrected image associated with the training sample. In particular embodiments, the identifications may be for particular objects with known true colors. For example, a sample training input may include an image containing a red colored octagon (i.e., eight-sided polygon) and a corresponding ground-truth label representing that the red colored octagon is a stop sign. As another example, a sample training input may include an image containing an orange colored quadrilateral (i.e., four-sided polygon) and a corresponding ground-truth label representing that the orange-colored quadrilateral is a temporary traffic control sign (e.g., workers ahead, utility work ahead, shoulder work, etc.).

Figure 5:
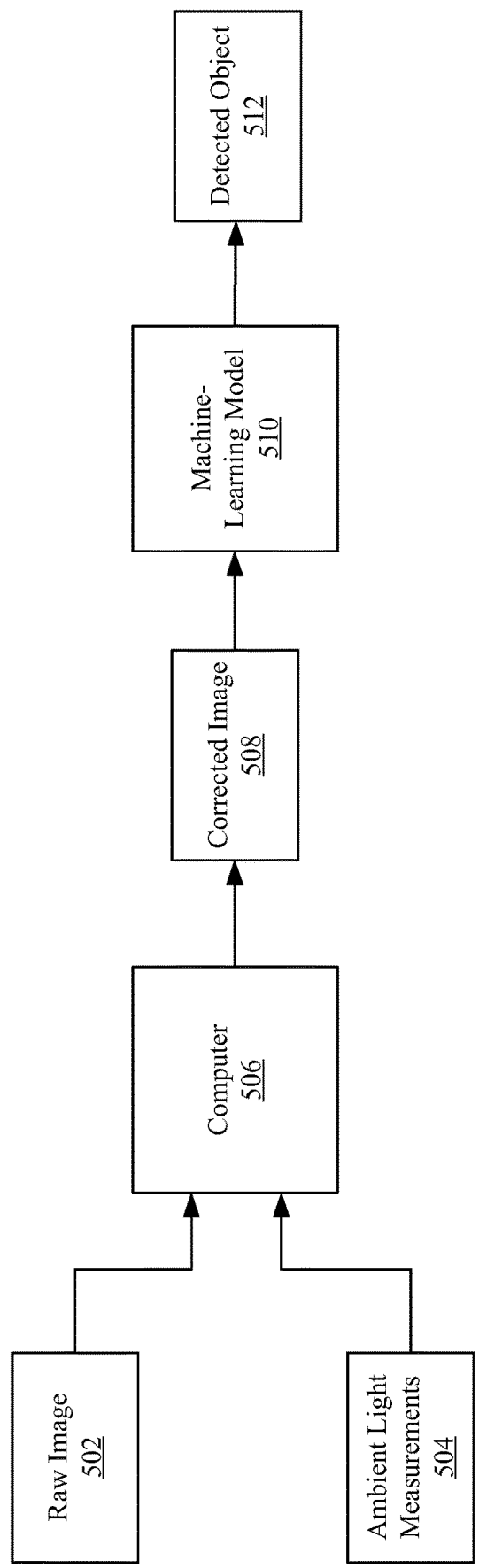
FIG. 5 illustrates another example machine-learning embodiment where an image may be first processed or pre-processed using ambient light information and then provided to a machine-learning model for object detection.

The above two-step process of object detection may be performed in a variety of ways. FIG. 5 illustrates an embodiment where a raw image 502 may be first processed or pre-processed using ambient light information 504 by a computer 506 to algorithmically generate a corrected image 508 (e.g., based on the relationship between ambient light and measured color as represented in equations (1), (2), and (3) above). Thereafter, the corrected image 508 may be provided to a machine-learning model 510 for object detection or to output a detected object classification 512. In the embodiment illustrated in FIG. 5, the machine-learning model 510 may be configured to perform the second step of the object detection process, as discussed above. The machine-learning model 510 may be trained here based on a set of corrected images in which color of objects has been corrected based on detected ambient light and a set of known objects labels (the ground truth) corresponding to the objects in the scene.

Figure 6:
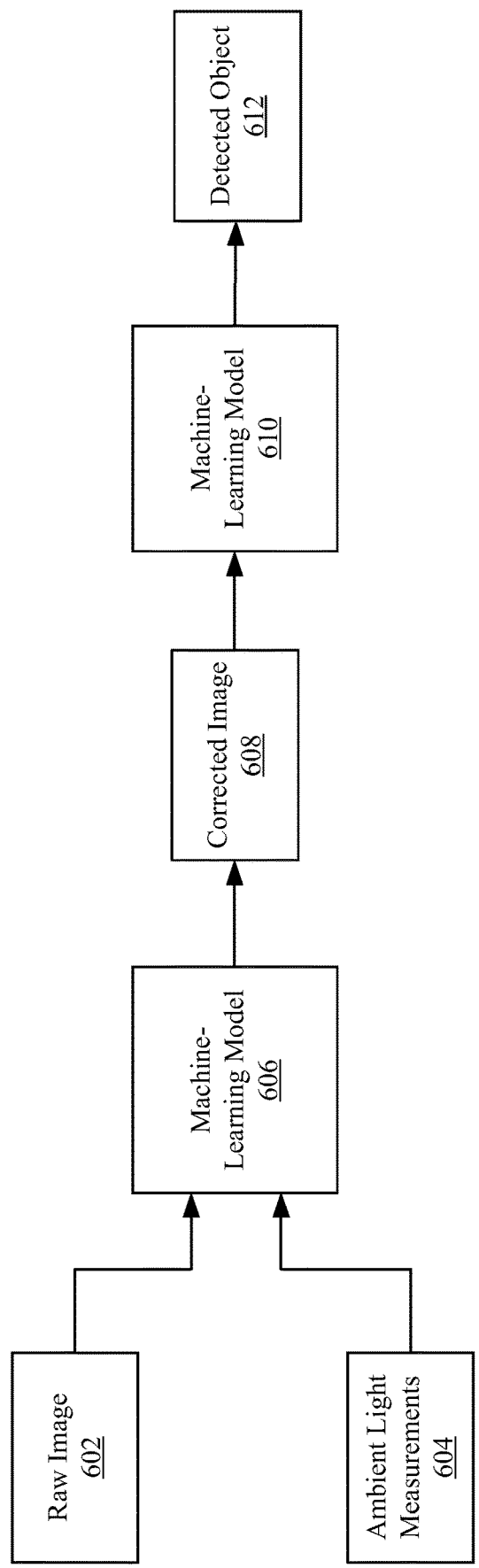
FIG. 6 illustrates yet another example machine-learning embodiment where an image may be processed for color correction by a first machine-learning model and then color-corrected image may be feed into a second machine-learning model for object detection.

In some embodiments, the two steps of the object detection process may be performed by two different machine-learning models. For instance, the first step of color correction/estimation may be performed by a first machine-learning model and the second step of object detection based on corrected/estimated color may be performed by a second machine-learning model. FIG. 6 illustrates such an embodiment, where an image 602 is processed by a first machine-learning model 606 using ambient light information 604 to output a corrected image 608. In particular embodiments, the machine-learning model 606 may be trained to perform this first step of color correction/estimation based on a set of sample training inputs and outputs. For example, a sample training input may include a raw image of a sample visual scene including a sample object and ambient light measurements for the sample visual scene, and a corresponding sample output may include a corrected image of the sample visual scene, where the corrected image represents the true color of the sample object. The machine-learning model 406 may be trained based on these sample inputs and outputs to perform color correction/estimation of the image discussed herein. The processed/corrected image 608 may then be fed into a second machine-learning model 610 for object detection 612. The second machine-learning model 610 may be trained based on corrected images 608 generated by the first machine-learning model 606, with ground truth labels of objects within the scene. It should be understood that the present disclosure is not limited to the machine-learning embodiments discussed in reference to FIGS. 4-6 and that a variety of other embodiments and/or configurations are possible and within the scope of the present disclosure.

Figure 7:
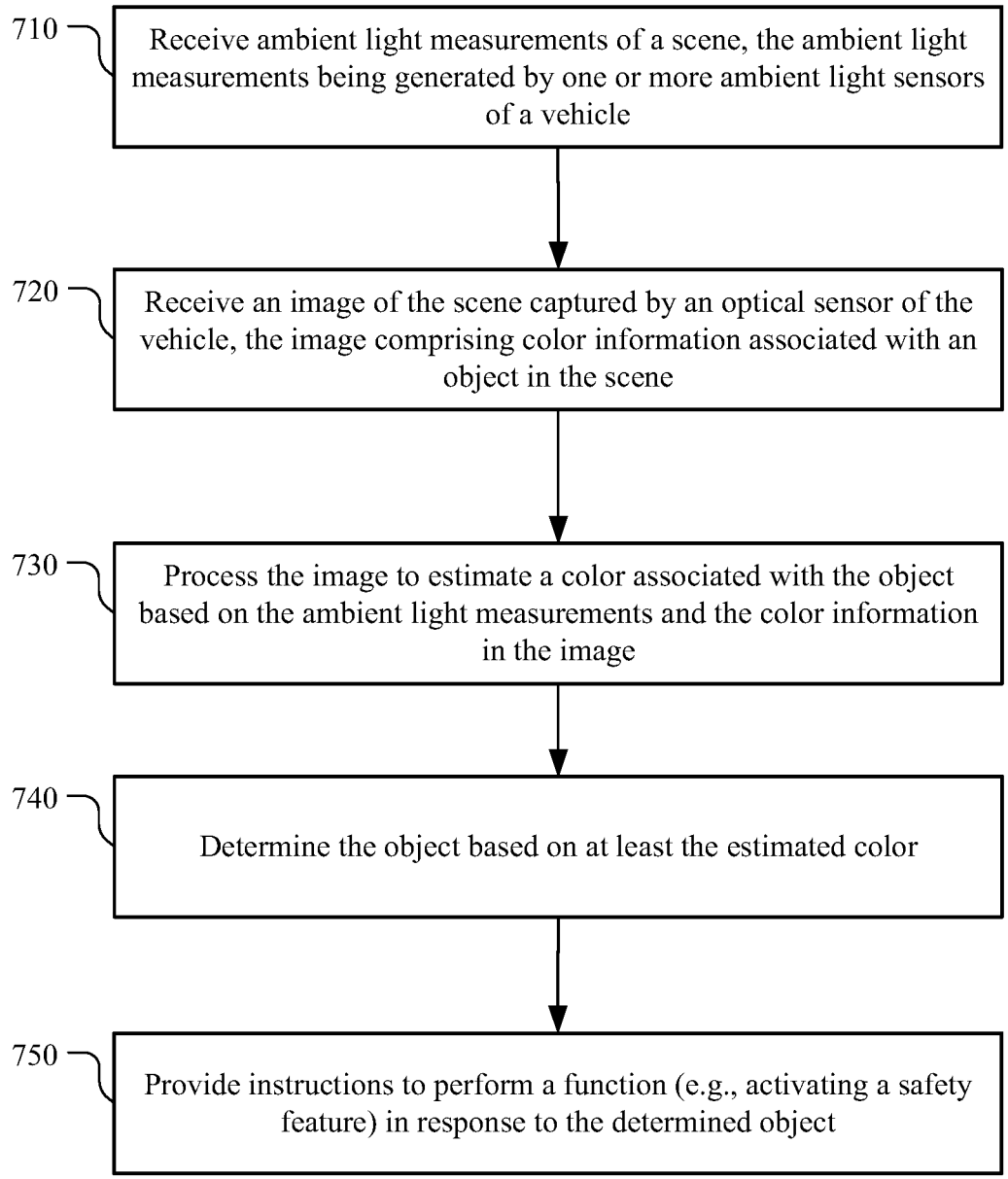
FIG. 7 is a flowchart of an example method for detecting one or more objects in an image using ambient light information.

FIG. 7 is a flowchart of an example method 700 for detecting one or more objects in an image using ambient light information. The method 700 begins at step 710, where a computing system may receive ambient light measurements of a scene. The ambient light measurements may be generated by one or more ambient light sensors of a vehicle (which may be an autonomous or manually-driven vehicle). In some embodiments, the ambient light measurements may include light-intensity measurements at different wavelength subranges within a wavelength range (e.g., 400-900 nm). In some embodiments, the ambient light measurements may be represented or stored in a table, which may include a first column consisting of a set of wavelength values, and a second column consisting of intensity of ambient light corresponding to each of the wavelength values in the set. At step 720, the computing system may receive an image of the scene. The image may be captured by an optical sensor (e.g., a CMOS sensor) of the vehicle and may include color information associated with an object in the scene. The color information may include at least 1) a color intensity of each of red, green, and blue channels over a particular wavelength range, and 2) an intensity of ambient light in the particular wavelength range. At step 730, the computing system may process the image to estimate a color associated with the object based on the ambient light measurements and the color information in the image. In particular embodiments, processing the image to estimate the color associated with the object may include deconvolving the ambient light present in one or more of the red, green, or blue channels in the particular wavelength range from the measured color information. In some embodiments, the estimated color may substantially be the true color of the object. At step 740, the computing system may determine the object based on the estimated color. In some embodiments, processing the image to estimate the color and detecting the object based on the estimated color may be performed by a same machine-learning model. In some embodiments, processing the image to estimate the color and detecting the object based on the estimated color may be performed by different machine-learning models. At step 750, the computing system may provide instructions to perform a function in response to the determined object. As previously described, the function may be activating a safety feature (e.g., providing driving instructions, displaying relevant information, generating an alert, sharing the location of a potential hazard with others, etc.) or any other suitable function that may benefit from the recognition of the object.

Particular embodiments may repeat one or more steps of the method 700 of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for detecting one or more objects in an image using ambient light information, including the particular steps of the method of FIG. 7, this disclosure contemplates any suitable method for detecting one or more objects in an image using ambient light information, including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

In particular embodiments, object detection in poorly lit conditions (e.g., at night, during cloudy weather, or in a tunnel) may further take into consideration the known ambient light source provided by the vehicle. For example, the vehicle may know the ambient light characteristics of its own headlights (e.g., based on the specifications provided by the headlights' manufacturer or measurements performed during routine maintenance). In poorly lit conditions where headlights are used for illumination, the vehicle may, in addition to the ambient light detected by its ambient light sensors, further take into consideration the ambient light provided by its headlights to estimate the true color of objects and use the color estimations to improve object-detection accuracy.

In particular embodiments, a vehicle equipped with ambient light sensors may enable display devices used within the vehicle to automatically adjust display settings to provide improved user experience. For example, the vehicle may have external ambient light sensors for measuring ambient light external to the vehicle (e.g., street lights, sun light, etc.) as well as internal ambient light sensors for measuring ambient light in the passenger compartment of the vehicle. In particular embodiments, the vehicle may be configured to communicate (e.g., via a wired or wireless connection) the measured external and/or internal ambient light information or associated aggregate information to a display device used within the vehicle. The display device may be a mobile device (e.g., smartphone, tablet, or laptop) of a passenger or it may be integrated with the vehicle (e.g., as built-in or detachable infotainment system). Based on the ambient information, the display device may adjust its color and/or contrast settings to provide the user with a better viewing experience. For example, if the ambient light at a particular time has an orange tint (e.g., at dusk), the display device may adjust its color settings to compensate for the ambient light and provide white balancing. Since the color perceived by the user is a function of the display's color and the ambient light reflected from the display, adjusting the display's settings could offset the lighting characteristics attributable to the ambient light.

In particular embodiments, collective ambient light information measured over a geographic region may be used in a variety of applications. In particular embodiments, a vehicle equipped with ambient light sensors may measure ambient light as it travels through a region. Measurement of ambient light at each instance may be associated with a geographic location (e.g., based on GPS measurements or other localization techniques) and timestamp at which the measurement was taken. In particular embodiments, each ambient light measurement may also be associated with the temperature at the time of measurement (since temperature may affect ambient light sources, such as florescent light) and/or weather conditions at the time of measurement. Over time, the ambient light measurements gathered by the vehicle may be used to generate a spatial and/or temporal map of ambient light information. In particular embodiments, the ambient light map may be generated based on measurements collected and shared by a fleet of vehicles equipped with ambient light sensors (e.g., the fleet of vehicles may be associated with a transportation management system). In particular embodiments, as a vehicle is traveling through a particular location at a particular time and/or in a particular temperature, such circumstantial parameters may be used to lookup the ambient light map and find the expected ambient light. The expected ambient light may be used to refine the current ambient light measured by the vehicle and help with color estimation and object detection, as previously described. Further, the expected ambient light information may be used by vehicles with faulty, limited, and/or no ambient light monitoring capabilities to perform similar functionality as described herein without directly measuring the ambient light. The ambient light map may also be provided to third parties. For example, current ambient light measurements may be compared with the corresponding expected ambient light information from the ambient light map (e.g., based on location, time, weather, temperature, etc.), and deviations beyond a certain threshold may cause the deviation to be sent to maintenance systems of public utilities or city infrastructure organizations so that they may investigate whether street lamps in the region need to be replaced. As another example, the ambient light map may be provided to the manufacturers of street lamps so that they may use the data to improve their products and/or track the output of such light sources over time.

Figure 8:
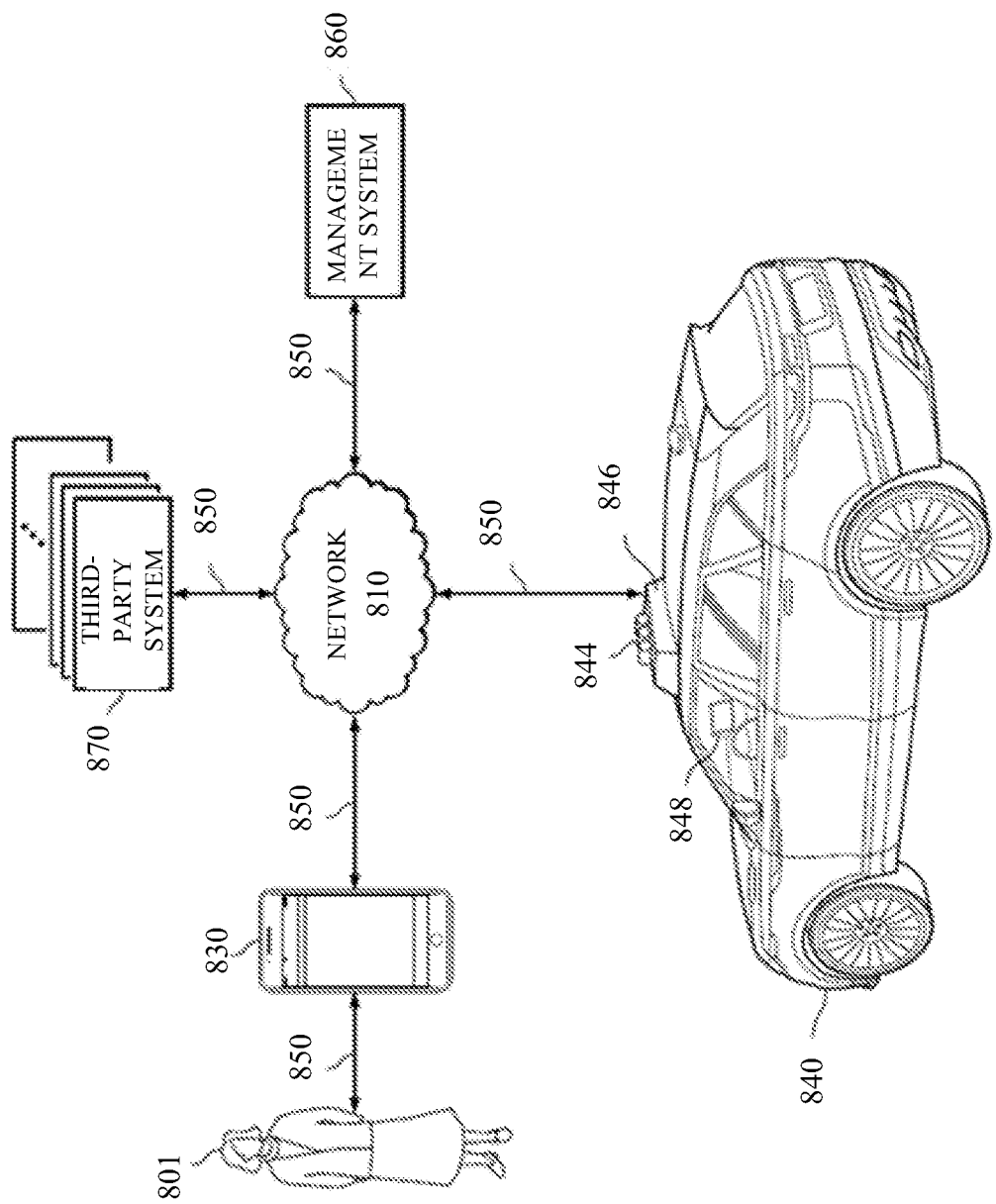
FIG. 8 illustrates an example block diagram of a transportation management environment for matching ride requestors with autonomous vehicles.

FIG. 8 illustrates an example block diagram of a transportation management environment for matching ride requestors with autonomous vehicles. In particular embodiments, the environment may include various computing entities, such as a user computing device 830 of a user 801 (e.g., a ride provider or requestor), a transportation management system 860, an autonomous vehicle 840, and one or more third-party system 870. The computing entities may be communicatively connected over any suitable network 810. As an example and not by way of limitation, one or more portions of network 810 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 8 illustrates a single user device 830, a single transportation management system 860, a single vehicle 840, a plurality of third-party systems 870, and a single network 810, this disclosure contemplates any suitable number of each of these entities. As an example and not by way of limitation, the network environment may include multiple users 801, user devices 830, transportation management systems 860, autonomous-vehicles 840, third-party systems 870, and networks 810.

The user device 830, transportation management system 860, autonomous vehicle 840, and third-party system 870 may be communicatively connected or co-located with each other in whole or in part. These computing entities may communicate via different transmission technologies and network types. For example, the user device 830 and the vehicle 840 may communicate with each other via a cable or short-range wireless communication (e.g., Bluetooth, NFC, WI-FI, etc.), and together they may be connected to the Internet via a cellular network accessible to either one of the devices (e.g., the user device 830 may be a smartphone with LTE connection). The transportation management system 860 and third-party system 870, on the other hand, may be connected to the Internet via their respective LAN/WLAN networks and Internet Service Providers (ISP). FIG. 8 illustrates transmission links 850 that connect user device 830, autonomous vehicle 840, transportation management system 860, and third-party system 870 to communication network 810. This disclosure contemplates any suitable transmission links 850, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 850 may connect to one or more networks 810, which may include in part, e.g., ad hoc network, the Intranet, extranet, VPN, LAN, WLAN, WAN, WWAN, MAN, PSTN, a cellular network, a satellite network, or any combination thereof. The computing entities need not necessarily use the same type of transmission link 850. For example, the user device 830 may communicate with the transportation management system via a cellular network and the Internet, but communicate with the autonomous vehicle 840 via Bluetooth or a physical wire connection.

In particular embodiments, the transportation management system 860 may fulfill ride requests for one or more users 801 by dispatching suitable vehicles. The transportation management system 860 may receive any number of ride requests from any number of ride requestors 801. In particular embodiments, a ride request from a ride requestor 801 may include an identifier that identifies them in the system 860. The transportation management system 860 may use the identifier to access and store the ride requestor's 801 information, in accordance with his/her privacy settings. The ride requestor's 801 information may be stored in one or more data stores (e.g., a relational database system) associated with and accessible to the transportation management system 860. In particular embodiments, ride requestor information may include profile information about a particular ride requestor 801. In particular embodiments, the ride requestor 801 may be associated with one or more categories or types, through which the ride requestor 801 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 860 may classify a user 801 based on known information about the user 801 (e.g., using machine-learning classifiers), and use the classification to retrieve relevant aggregate information associated with that class. For example, the system 860 may classify a user 801 as a teenager and retrieve relevant aggregate information associated with teenagers, such as the type of music generally preferred by teenagers.

Transportation management system 860 may also store and access ride information. Ride information may include locations related to the ride, traffic data, route options, optimal pick-up or drop-off locations for the ride, or any other suitable information associated with a ride. As an example and not by way of limitation, when the transportation management system 860 receives a request to travel from San Francisco International Airport (SFO) to Palo Alto, Calif., the system 860 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 860. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 860. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to news, etc. As yet another example, historical data associated with all users may include general usage trends, such as traffic and ride patterns. Using historical data, the system 860 in particular embodiments may predict and provide ride suggestions in response to a ride request. In particular embodiments, the system 860 may use machine-learning, such as neural-networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 860 may include one or more servers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 860 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or other suitable database system. Although this disclosure describes or illustrates particular types of databases, this disclosure contemplates any suitable types of databases. Particular embodiments may provide interfaces that enable a user device 830 (which may belong to a ride requestor or provider), a transportation management system 860, vehicle system 840, or a third-party system 870 to process, transform, manage, retrieve, modify, add, or delete the information stored in data store.

In particular embodiments, transportation management system 860 may include an authorization server (or other suitable component(s)) that allows users 801 to opt-in to or opt-out of having their information and actions logged, recorded, or sensed by transportation management system 860 or shared with other systems (e.g., third-party systems 870). In particular embodiments, a user 801 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 801 of transportation management system 860 through blocking, data hashing, anonymization, or other suitable techniques as appropriate.

In particular embodiments, third-party system 870 may be a network-addressable computing system that may host GPS maps, customer reviews, music or content, weather information, or any other suitable type of information. Third-party system 870 may generate, store, receive, and send relevant data, such as, for example, map data, customer review data from a customer review website, weather data, or any other suitable type of data. Third-party system 870 may be accessed by the other computing entities of the network environment either directly or via network 810. For example, user device 830 may access the third-party system 870 via network 810, or via transportation management system 860. In the latter case, if credentials are required to access the third-party system 870, the user 801 may provide such information to the transportation management system 860, which may serve as a proxy for accessing content from the third-party system 870.

In particular embodiments, user device 830 may be a mobile computing device such as a smartphone, tablet computer, or laptop computer. User device 830 may include one or more processors (e.g., CPU and/or GPU), memory, and storage. An operation system and applications may be installed on the user device 830, such as, e.g., a transportation application associated with the transportation management system 860, applications associated with third-party systems 870, and applications associated with the operating system. User device 830 may include functionality for determining its location, direction, or orientation, based on integrated sensors such as GPS, compass, gyroscope, or accelerometer. User device 830 may also include wireless transceivers for wireless communication, and may support wireless communication protocols such as Bluetooth, near-field communication (NFC), infrared (IR) communication, WI-FI, and/or 2G/3G/4G/LTE mobile communication standard. User device 830 may also include one or more cameras, scanners, touchscreens, microphones, speakers, and any other suitable input-output devices.

In particular embodiments, the vehicle 840 may be an autonomous vehicle and equipped with an array of sensors 844, a navigation system 846, and a ride-service computing device 848. In particular embodiments, a fleet of autonomous vehicles 840 may be managed by the transportation management system 860. The fleet of autonomous vehicles 840, in whole or in part, may be owned by the entity associated with the transportation management system 860, or they may be owned by a third-party entity relative to the transportation management system 860. In either case, the transportation management system 860 may control the operations of the autonomous vehicles 840, including, e.g., dispatching select vehicles 840 to fulfill ride requests, instructing the vehicles 840 to perform select operations (e.g., head to a service center or charging/fueling station, pull over, stop immediately, self-diagnose, lock/unlock compartments, change music station, change temperature, and any other suitable operations), and instructing the vehicles 840 to enter select operation modes (e.g., operate normally, drive at a reduced speed, drive under the command of human operators, and any other suitable operational modes).

In particular embodiments, the autonomous vehicles 840 may receive data from and transmit data to the transportation management system 860 and the third-party system 870. Example of received data may include, e.g., instructions, new software or software updates, maps, 3D models, trained or untrained machine-learning models, location information (e.g., location of the ride requestor, the autonomous vehicle 840 itself, other autonomous vehicles 840, and target destinations such as service centers), navigation information, traffic information, weather information, entertainment content (e.g., music, video, and news) ride requestor information, ride information, and any other suitable information. Examples of data transmitted from the autonomous vehicle 840 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 840, passengers may send/receive data to the transportation management system 860 and/or third-party system 870), and any other suitable data.

In particular embodiments, autonomous vehicles 840 may also communicate with each other as well as other traditional human-driven vehicles, including those managed and not managed by the transportation management system 860. For example, one vehicle 840 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 860 or third-party system 870).

In particular embodiments, an autonomous vehicle 840 may obtain and process sensor/telemetry data. Such data may be captured by any suitable sensors. For example, the vehicle 840 may have a Light Detection and Ranging (LiDAR) sensor array of multiple LiDAR transceivers that are configured to rotate 360°, emitting pulsed laser light and measuring the reflected light from objects surrounding vehicle 840. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 840. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 840 may have optical cameras pointing in different directions. The cameras may be used for, e.g., recognizing roads, lane markings, street signs, traffic lights, police, other vehicles, and any other visible objects of interest. To enable the vehicle 840 to "see" at night, infrared cameras may be installed. In particular embodiments, the vehicle may be equipped with stereo vision for, e.g., spotting hazards such as pedestrians or tree branches on the road. As another example, the vehicle 840 may have radars for, e.g., detecting other vehicles and/or hazards afar. Furthermore, the vehicle 840 may have ultra sound equipment for, e.g., parking and obstacle detection. In addition to sensors enabling the vehicle 840 to detect, measure, and understand the external world around it, the vehicle 840 may further be equipped with sensors for detecting and self-diagnosing the its own state and condition. For example, the vehicle 840 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieving using any combination of sensors. For example, an autonomous vehicle 840 may build a 3D model of its surrounding based on data from its LiDAR, radar, sonar, and cameras, along with a pre-generated map obtained from the transportation management system 860 or the third-party system 870. Although sensors 844 appear in a particular location on autonomous vehicle 840 in FIG. 8, sensors 844 may be located in any suitable location in or on autonomous vehicle 840. Example locations for sensors include the front and rear bumpers, the doors, the front windshield, on the side paneling, or any other suitable location.

In particular embodiments, the autonomous vehicle 840 may be equipped with a processing unit (e.g., one or more CPUs and GPUs), memory, and storage. The vehicle 840 may thus be equipped to perform a variety of computational and processing tasks, including processing the sensor data, extracting useful information, and operating accordingly. For example, based on images captured by its cameras and a machine-vision model, the vehicle 840 may identify particular types of objects captured by the images, such as pedestrians, other vehicles, lanes, curbs, and any other objects of interest.

In particular embodiments, the autonomous vehicle 840 may have a navigation system 846 responsible for safely navigating the autonomous vehicle 840. In particular embodiments, the navigation system 846 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 846 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 846 may use its determinations to control the vehicle 840 to operate in prescribed manners and to guide the autonomous vehicle 840 to its destinations without colliding into other objects. Although the physical embodiment of the navigation system 846 (e.g., the processing unit) appears in a particular location on autonomous vehicle 840 in FIG. 8, navigation system 846 may be located in any suitable location in or on autonomous vehicle 840. Example locations for navigation system 846 include inside the cabin or passenger compartment of autonomous vehicle 840, near the engine/battery, near the front seats, rear seats, or in any other suitable location.

In particular embodiments, the autonomous vehicle 840 may be equipped with a ride-service computing device 848, which may be a tablet or other suitable device installed by transportation management system 860 to allow the user to interact with the autonomous vehicle 840, transportation management system 860, other users 801, or third-party systems 870. In particular embodiments, installation of ride-service computing device 848 may be accomplished by placing the ride-service computing device 848 inside autonomous vehicle 840, and configuring it to communicate with the vehicle 840 via a wire or wireless connection (e.g., via Bluetooth). Although FIG. 8 illustrates a single ride-service computing device 848 at a particular location in autonomous vehicle 840, autonomous vehicle 840 may include several ride-service computing devices 848 in several different locations within the vehicle. As an example and not by way of limitation, autonomous vehicle 840 may include four ride-service computing devices 848 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 848 may be detachable from any component of autonomous vehicle 840. This may allow users to handle ride-service computing device 848 in a manner consistent with other tablet computing devices. As an example and not by way of limitation, a user may move ride-service computing device 848 to any location in the cabin or passenger compartment of autonomous vehicle 840, may hold ride-service computing device 848 in his/her lap, or handle ride-service computing device 848 in any other suitable manner. Although this disclosure describes providing a particular computing device in a particular manner, this disclosure contemplates providing any suitable computing device in any suitable manner.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described in further detail below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductorbased or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving ambient light measurements of ambient light of a scene from one or more light sensors of a vehicle, the ambient light measurements comprising one or more color wavelength ranges of the ambient light and an intensity of the one or more color wavelength ranges of the ambient light;
   receiving an image captured by an optical sensor of the vehicle, the image comprising perceived color information associated with an object in the scene, wherein the perceived color information includes at least one color wavelength range associated with the image of the object;
   comparing the one or more color wavelength ranges of the ambient light with the at least one color wavelength range associated with the image of the object;
   based on the comparing, estimating a color associated with the object by using the intensity of the one or more color wavelength ranges of the ambient light and the at least one color wavelength range of the perceived color information associated with the image of the object;
   determining the object based at least in part on the estimated color; and
   providing instructions to perform a vehicle action in response to the determined object.

2. The method of claim 1, wherein:
   the perceived color information further comprises a color intensity of each of red, green, and blue channels of the at least one color wavelength range associated with the image of the object; and
   the ambient light measurements further comprise a color intensity of each of red, green, and blue channels of the one or more color wavelength ranges of the ambient light.

3. The method of claim 2, wherein comparing the one or more color wavelength ranges of the ambient light with the at least one color wavelength range associated with the image of the object comprises:
   comparing the color intensity of the red, green, and blue channels of the at least one color wavelength range associated with the image of the object and the color intensity of the red, green, and blue channels of the one or more color wavelength ranges of the ambient light.

4. The method of claim 1, wherein estimating the color associated with the object and determining the object based at least in part on the estimated color are performed by a machine-learning model.

5. The method of claim 4, wherein the machine-learning model is trained based on a set of training samples, each of the training samples comprising:
   a raw image of a sample visual scene including a sample object, wherein perceived color information of the sample object is a result of a true color of the sample object and ambient light reflected or bounced off from the sample object;
   ambient light measurements for the sample visual scene; and
   a corrected image of the sample visual scene, the corrected image representing the true color of the sample object.

6. The method of claim 1, wherein the one or more color wavelength ranges of the ambient light correspond to the at least one color wavelength range associated with the image of the object.

7. The method of claim 1, wherein the vehicle action comprises performing at least one of:
   activating a safety feature of the vehicle;
   adjusting a display setting of a display device within the vehicle based on the ambient light measurements; or
   generating an alert associated with the determined object.

8. The method of claim 1, wherein estimating the color associated with the object includes correcting the perceived color information.

9. The method of claim 1, wherein estimating the color associated with the object by using the intensity of the one or more color wavelength ranges of the ambient light and the at least one color wavelength range of the perceived color information associated with the image of the object comprises:
   deconvolving the one or more color wavelength ranges of the ambient light from the at least one color wavelength range of the perceived color information associated with the image of the object.

10. The method of claim 9, wherein deconvolving the one or more color wavelength ranges of the ambient light from the at least one color wavelength range of the perceived color information associated with the image of the object comprises subtracting the intensity of the one or more color wavelength ranges of the ambient light from the at least one color wavelength range of the perceived color information associated with the image of the object.

11. The method of claim 1, wherein:
the ambient light measurements comprise a plurality of color wavelength ranges of the ambient light of the scene;
the perceived color information comprises a plurality of color wavelength ranges associated with the image of the object; and
comparing the one or more color wavelength ranges of the ambient light with the at least one color wavelength range associated with the image of the object comprises:
comparing an intensity of each wavelength of the plurality of color wavelength ranges associated with the image of the object with an intensity of a corresponding color wavelength range of the plurality of color wavelength ranges of the ambient light of the scene.

12. The method of claim 1, wherein comparing the one or more color wavelength ranges of the ambient light with the at least one color wavelength range associated with the image of the object comprises:
determining one or more color wavelength ranges of the ambient light that correspond with the at least one color wavelength range associated with the image of the object.

13. The method of claim 1, further comprising:
determining true red, green, and blue components for another color wavelength range associated with the image of the object after comparing the one or more color wavelength ranges of the ambient light with the at least one color wavelength range associated with the image of the object;
comparing the other color wavelength range associated with the image of the object with a corresponding wavelength range of the ambient light; and
further estimating the color associated with the object based on the comparison of the other color wavelength range associated with the image of the object with the corresponding wavelength range of the ambient light.

14. The method of claim 1, wherein the perceived color information is a result of at least the ambient light of the scene and reflectance properties of the object in the scene.

15. A system comprising: one or more processors and one or more computer-readable non-transitory storage media coupled to the one or more processors, the one or more computer-readable non-transitory storage media comprising instructions operable when executed by the one or more processors to cause the system to perform operations comprising:
receiving ambient light measurements of ambient light of a scene from one or more light sensors of a vehicle, the ambient light measurements comprising one or more color wavelength ranges of the ambient light and an intensity of the one or more color wavelength ranges of the ambient light;
receiving an image captured by an optical sensor of the vehicle, the image comprising perceived color information associated with an object in the scene, wherein the perceived color information includes at least one color wavelength range associated with the image of the object;
comparing the one or more color wavelength ranges of the ambient light with the at least one color wavelength range associated with the image of the object;
based on the comparing, estimating a color associated with the object by using the intensity of the one or more color wavelength ranges of the ambient light and the at least one color wavelength range of the perceived color information associated with the image of the object;
determining the object based at least in part on the estimated color; and
providing instructions to perform a vehicle action in response to the determined object.

16. The system of claim 15, wherein estimating the color associated with the object and determining the object based at least in part on the estimated color are performed by a machine-learning model.

17. The system of claim 16, wherein the machine-learning model is trained based on a set of training samples, wherein at least one training sample in the set of training samples comprises:
a corrected image whose perceived color information has been corrected based on detected ambient light; and
at least one identification of an object depicted in the corrected image.

18. The system of claim 15, wherein comparing the one or more color wavelength ranges of the ambient light with the at least one color wavelength range associated with the image of the object comprises:
determining one or more color wavelength ranges of the ambient light that correspond with the at least one color wavelength range associated with the image of the object.

19. One or more computer-readable non-transitory storage media embodying software that is operable when executed to cause one or more processors to perform operations comprising:
receiving ambient light measurements of ambient light of a scene from one or more light sensors of a vehicle, the ambient light measurements comprising one or more color wavelength ranges of the ambient light and an intensity of the one or more color wavelength ranges of the ambient light;
receiving an image captured by an optical sensor of the vehicle, the image comprising perceived color information associated with an object in the scene, wherein the perceived color information includes at least one color wavelength range associated with the image of the object;
comparing the one or more color wavelength ranges of the ambient light with the at least one color wavelength range associated with the image of the object;
based on the comparing, estimating a color associated with the object by using the intensity of the one or more color wavelength ranges of the ambient light and the at least one color wavelength range of the perceived color information associated with the image of the object;
determining the object based at least in part on the estimated color; and
providing instructions to perform a vehicle action in response to the determined object.

20. The one or more computer-readable non-transitory storage media of claim 19, wherein estimating the color associated with the object and determining the object based at least in part on the estimated color are performed by a machine-learning model.

* * * * *